US007718968B1

(12) United States Patent  (10) Patent No.: US 7,718,968 B1
Murguia  (45) Date of Patent: May 18, 2010

(54) MULTI-FILTER SPECTRAL DETECTION SYSTEM FOR DETECTING THE PRESENCE WITHIN A SCENE OF A PREDEFINED CENTRAL WAVELENGTH OVER AN EXTENDED OPERATIVE TEMPERATURE RANGE

(75) Inventor: James E. Murguia, Hollis, NH (US)

(73) Assignee: Solid State Scientific Corporation, Hollis, NH (US)

( * ) Notice: Subject to any disclaimer, the term of this patent is extended or adjusted under 35 U.S.C. 154(b) by 11 days.

(21) Appl. No.: 12/008,766

(22) Filed: Jan. 14, 2008

Related U.S. Application Data

(60) Provisional application No. 60/880,627, filed on Jan. 16, 2007.

(51) Int. Cl.
*G01J 5/02* (2006.01)
(52) U.S. Cl. ............... 250/339.15; 250/330; 250/338.1; 250/339.11; 250/339.14; 250/554; 356/45
(58) Field of Classification Search ............... 250/208.1, 250/339.04, 554, 330, 338.1, 339.11, 339.14, 250/339.15; 356/43, 45; 359/288
See application file for complete search history.

(56) References Cited

U.S. PATENT DOCUMENTS

| | | | | |
|---|---|---|---|---|
| 5,041,723 A | * | 8/1991 | Ishida et al. ............ | 250/339.01 |
| 5,479,015 A | | 12/1995 | Rudman et al. | |
| 6,946,647 B1 | * | 9/2005 | O'Neill et al. ............ | 250/227.2 |
| 2002/0089596 A1 | * | 7/2002 | Suda ......................... | 348/302 |
| 2003/0107724 A1 | * | 6/2003 | Hashimoto et al. ............ | 356/45 |

* cited by examiner

*Primary Examiner*—Georgia Y Epps
*Assistant Examiner*—Kevin Wyatt
(74) *Attorney, Agent, or Firm*—Louis J. Franco; Law Office of Louis J. Franco

(57) ABSTRACT

A detector assembly for imaging a scene over a predetermined temperature range and a predetermined wavelength range including a central wavelength includes an imaging-sensor array, a plurality of focusing elements and a plurality of optical filtering elements. The imaging-sensor array includes a plurality of detector-array sections and the focusing elements are arranged with respect to the detector array such that each focusing element is capable of focusing upon a corresponding one of the detector-array sections an image of the scene correlating to the image of the scene that each of the other focusing elements is capable of focusing upon the detector-array section corresponding thereto. Each focusing element and the detector-array section corresponding thereto defines an associated optical path. Disposed within each optical path is an optical filtering element such that electromagnetic energy that passes through that filtering element impinges upon the detector-array section optically correlated with that filtering element. Each filtering element is configured to transmit, at a filter-specific maximum intensity, the central wavelength at a temperature disparate from the temperature at which each of the other filtering elements is configured to transmit the central wavelength. The transmittance as a function of temperature for each filtering element at least partially overlaps the transmittance as a function of temperature of at least one other filtering element among the plurality of filtering elements, thereby extending the operative temperature range of the detector assembly.

19 Claims, 4 Drawing Sheets

Figure 2A:
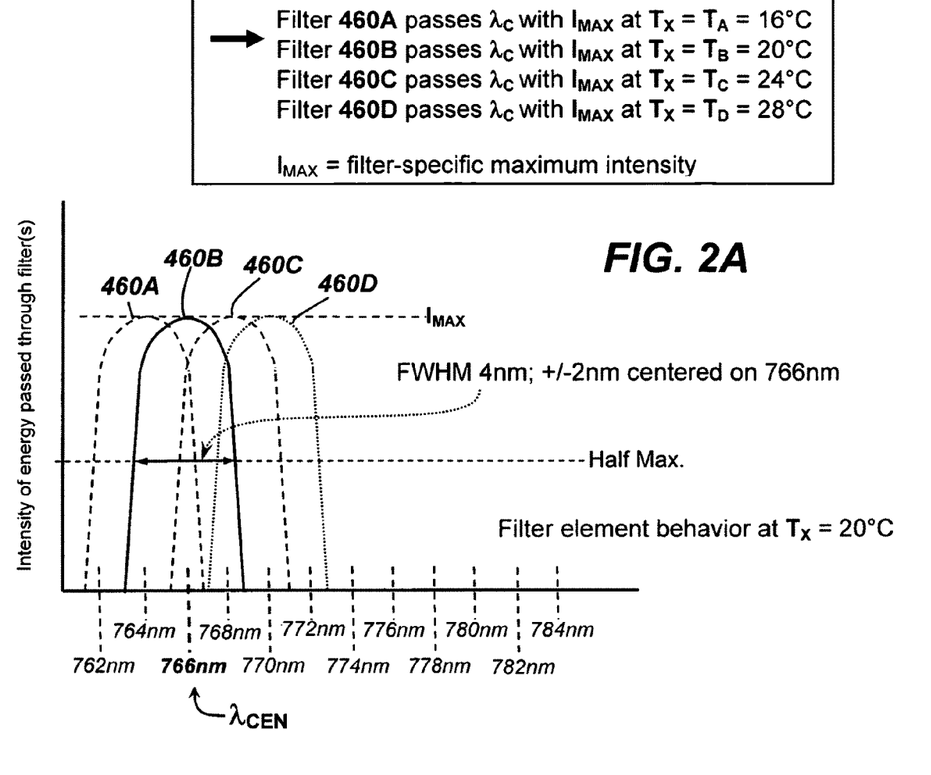
FIG. 2A graphically indicates illustrative temperature-dependent transmittance characteristics, at a first temperature, of four filtering elements associated with the embodiment depicted in FIG. 1.

At 20°C, for example, filter 460B passes the central wavelength $\lambda_{CEN}$ of 766nm with the greatest relative intensity ($I_{MAX}$). Filters 460A and 460C "overlap" with filter 460B in that filters 460A and 460C pass 766nm, but at a lower intensity than filter 460B passes the central wavelength $\lambda_{CEN}$ at 20°C, as indicated by the dashed transmittance curves associated with filters 460A and 460C. Finally, as indicated by the dotted transmittance curve, filter 460D does not pass 766nm at all at 20°C.

At 20°C, for example, filter 460B passes the central wavelength $\lambda_{CEN}$ of 766nm with the greatest relative intensity ($I_{MAX}$). Filters 460A and 460C "overlap" with filter 460B in that filters 460A and 460C pass 766nm, but at a lower intensity than filter 460B passes the central wavelength $\lambda_{CEN}$ at 20°C, as indicated by the dashed transmittance curves associated with filters 460A and 460C. Finally, as indicated by the dotted transmittance curve, filter 460D does not pass 766nm at all at 20°C.

FIG. 2B

Figure 2B:
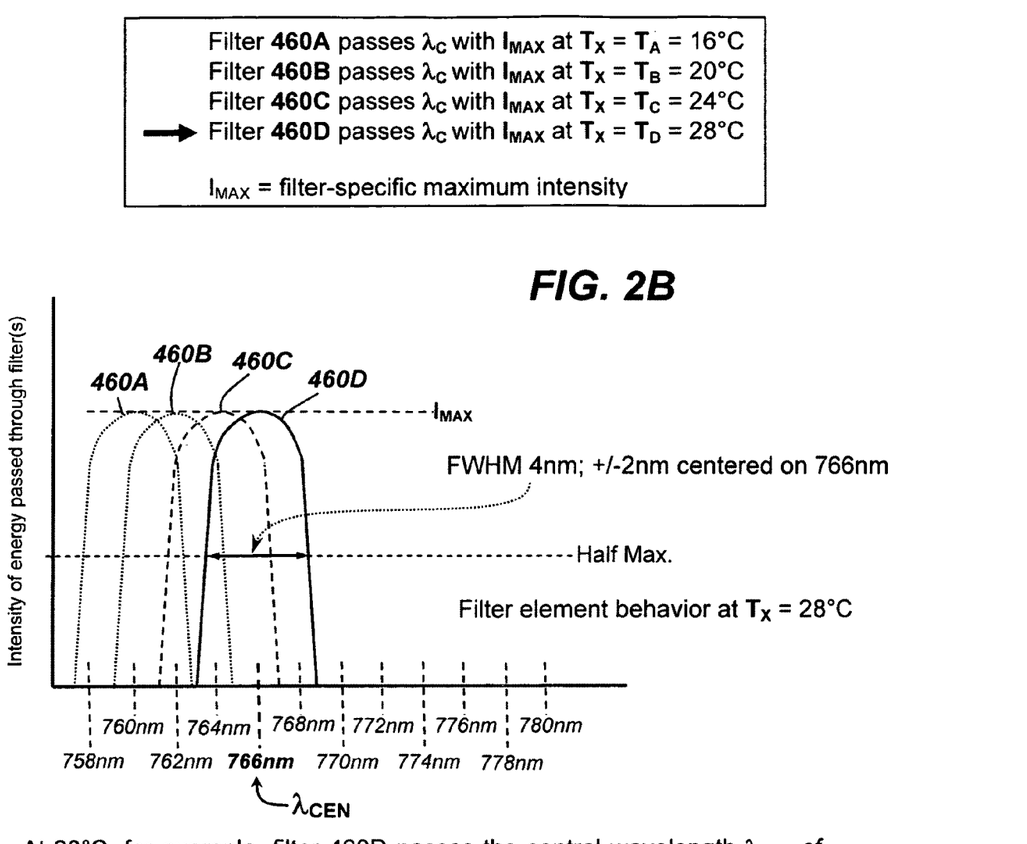
FIG. 2B graphically indicates illustrative temperature-dependent transmittance characteristics, at a second temperature, of the four illustrative filtering elements associated with the embodiment depicted in FIG. 1.

At 28°C, for example, filter 460D passes the central wavelength $\lambda_{CEN}$ of 766nm with the greatest relative intensity. Filter 460C alone "overlaps" with filter 460D in that filter 460C passes 766nm, but at a lower intensity than filter 460D passes the central wavelength $\lambda_{CEN}$ at 28°C, as indicated by the dashed transmittance curve associated with filter 460C. Finally, as indicated by the dotted transmittance curves, filter 460A and 460B do not pass 766nm at all at 28°C.

The difference in filter element behavior between 20°C and 28°C indicates that the effective wavelength at which each filter element 460A, B, C and D is centered drifts by .5nm with each 1-degree C change in temperature. That is, each of filter elements 460A, B, C and D has a temperature coefficient of .5nm/deg. C.

FIG. 3

Figure 3:
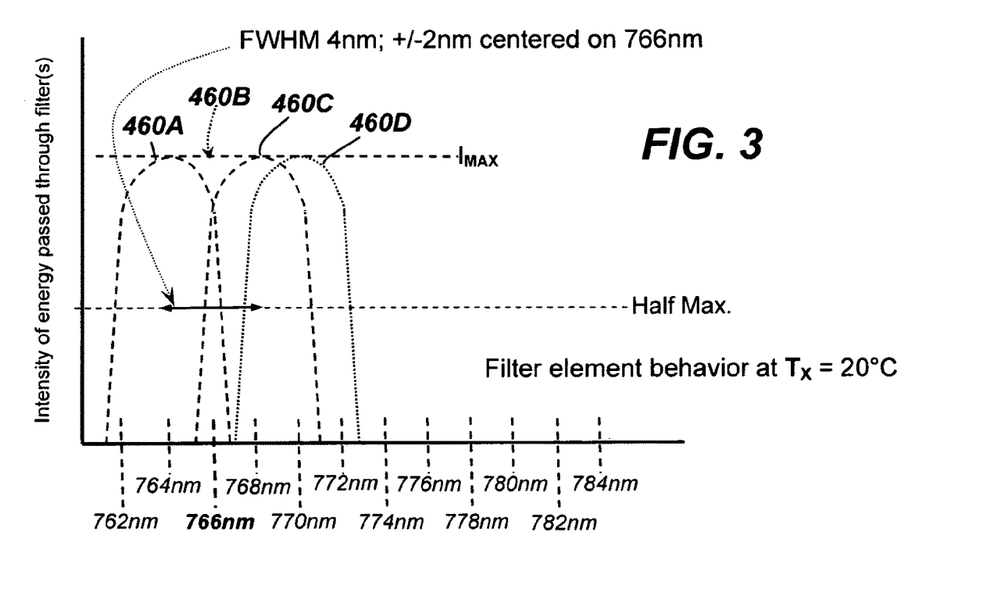
FIG. 3 graphically depicts a filtration redundancy scenario facilitated by a predetermined overlap in the temperature-dependent transmittances of "graphically adjacent" filtering elements.

Filtering element 460B which, in accordance with FIG. 2A, would pass the central wavelength $\lambda_{CEN}$ of 766nm with the greatest relative intensity at 20°C, is assumed to be non-operational, as indicated by the dotted arrow indicating where the transmittance curve for filtering element 460B would be located. Because the curves associated with filtering elements 460A and 460C "overlap" with one another and with that of filter 460B when filter 460B is operational, the central wavelength 766nm will be registered at the two detector-array sections associated with filters 460A and 460C at 20°C, but at a lesser intensity than it would have been registered at the detector-array section associated with filter 460B. Accordingly, filter 460A and 460C provide a measure of redundancy for filter 460B at 20°C.

MULTI-FILTER SPECTRAL DETECTION SYSTEM FOR DETECTING THE PRESENCE WITHIN A SCENE OF A PREDEFINED CENTRAL WAVELENGTH OVER AN EXTENDED OPERATIVE TEMPERATURE RANGE

PROVISIONAL PRIORITY CLAIM

Priority based on Provisional Application Ser. No. 60/880,627, filed Jan. 16, 2007, and inaptly entitled "SIMULTANEOUS SPECTRAL IMAGING SYSTEM INCLUDING COMMONLY FILTERED OPTICAL PATHS DEFINED BY FOCUSING ELEMENTS EXHIBITING DISPARATE F-NUMBERS," is claimed. Moreover, the entirety of the previous provisional application, including the drawings, is incorporated herein by reference as if set forth fully in the present application.

REFERENCE TO DISCLOSURE DOCUMENTS

For purposes of establishing independently verified and recorded dates of conception, reference is made to Disclosure Document No. 590581, filed Nov. 25, 2005, and Disclosure Document No. 591026, filed Dec. 6, 2005. The entireties of Disclosure Documents 590581 and 591026, including the drawings, are incorporated herein by reference as if set forth fully in the present provisional application. Disclosure Documents 590581 and 591026 were referenced in Provisional Application Ser. No. 60/880,627 and a separate document requesting preservation of this Disclosure Documents was filed therewith.

BACKGROUND

In a contemporary detection system, a viewed target or scene forms a single image upon a focal-plane detector array including a large number of discrete detector elements that are highly responsive to electromagnetic energy within a pre-selected wavelength range. The electrical outputs of the detector elements are communicatively linked to sophisticated signal processing circuitry. By rapidly analyzing the pattern and sequence of detector element excitations, the processing circuitry can identify and monitor sources of electromagnetic radiation that appear within a scene or field of view.

When it is desired to view a scene over different portions (wavelength ranges) of the electromagnetic spectrum, the scene is filtered through one or more optical filtering elements. In a traditional system, mechanically movable filters are interposed into an optical path defined by a focusing element and a corresponding section of the detector array onto which that focusing element projects an image of the scene. Generally, such filtering elements are selectively situated intermediate the focusing element and the detector array and are incorporated in what is know in the field as a "filter wheel" that is rotated to alter the wavelength ranges over which a scene is observed.

Although filter wheels are still used in some applications, practitioners in the field of spectral imaging have recognized shortcomings of systems that rely on the selective mechanical interposition of filters within an optical path in order to image a scene over different wavelength ranges. Among the disadvantages associated with such systems are the facts that they are inherently expensive, heavy, large and fragile. More specifically, the use of mechanisms to effect movement of the filters adds costs and weight to the detection system. More significantly, such mechanisms are mechanically complex and require a high degree of precision to obtain the desired results. Thus, the reliability and durability of moveable filters, and their drive mechanisms, are of particular concern. This is especially true in space-based applications wherein it is extremely difficult or impossible to conduct "field" repair of such systems. Mechanical movement of the filters also introduces an observation dead time associated with (i) the generation of control signals to initiate the filter change, (ii) settle-down times that depend on the inertial characteristics of the mechanical components, (iii) and slow speeds that may be necessary in order to preserve optical alignment, avoid setting up vibration, and prevent damage to fragile optics. In some military systems requiring extremely rapid response times, any time loss associated with filter switching may be highly undesirable or even unacceptable. Moreover, and quite significantly, moveable filters (e.g., filter wheels) provide spectral data that is necessarily sequential in nature. More specifically, a scene is viewed through a first filter and data representative of the scene is registered at the detector array and stored in computer memory. Subsequently, a second filter is moved into position to filter the scene over another wavelength range, and the procedure is repeated over as many filtered wavelength ranges as the particular application calls for. Much more desirable is the acquisition of all spectral data through all filter elements simultaneously. This is particularly important when viewing rapidly changing events such as missile launches, muzzle flashes, or other ephemeral events.

In recognition of the aforementioned considerations, multi-image detector assemblies have been developed. Such an assembly does not require the use of moveable filters or other optical components in order to sense different portions of the electromagnetic spectrum or otherwise modify the incoming source signal. Representative of such an assembly is that disclosed in U.S. Pat. No. 5,479,015 issued in the names of Rudman et al. on Dec. 26, 1995 (hereinafter, the '015 patent). The '015 patent is drawn to a multi-image detector assembly including an array of detector elements (e.g., a focal plane array) wherein the detector array includes a plurality of imaging-registering sections. Corresponding to each image-registering section is a focusing member that focuses an image of a scene upon the image-registering array section. The plural images focused upon the various array sections are, at least in their spatial aspects, substantially identical. Each focusing member defines, in combination with its corresponding array section, an optical path. Disposed within, and dedicated to, each optical path is an optical element that modifies the image transmitted along that optical path. The "optical elements" are optical filters that facilitate registration of various images of a single scene simultaneously over disparate wavelength regions within the electromagnetic spectrum.

Whether a filter wheel system or the more modern simultaneous image acquisition system, such as that described in the '015, is employed, the goal of each of these multi-filter systems has traditionally been to provide independent measures of the same scene. That is, to "view" and analyze a single scene over multiple wavelength ranges in an effort to discern, in broad terms, the spectral content of activity or "events" within the scene. Some detector systems, however, are configured to detect the presence of emission over a single narrow range including a central wavelength of interest, for example. For instance, in certain applications, the presence of potassium in combusting material may be of particular interest. Combusting potassium emits electromagnetic energy having a wavelength of 766 nm. Accordingly, an illustrative traditional system singularly configured to detect the combustion of potassium would include a focusing element optically aligned with a detector-array to define an optical path and a single filtering element, configured to transmit a very narrow spectral band centered at 766 nm, interposed within the optical path. A shortcoming of such systems, however, is that the transmittance of an optical filtering element shifts or "drifts" with changes in temperature. That is, inherent to an optical filtering element is a temperature coefficient. Consequently, a system configured for the detection of burning potassium may function perfectly well when the filter is in an environment of between 25° C. and 30° C., but the limitations of the filtering element may render the system "blind" to the 766 nm central wavelength when the filter temperature is outside the illustrative 5-degree range.

Accordingly, there exists a need for a multi-filter detector assembly that facilitates detection of the presence within a scene of a predetermined central wavelength over a broader operational temperature range than has been heretofore realizable through the implementation of traditional, single-filter solutions.

SUMMARY

In one illustrative implementation, a detector assembly for imaging a scene over a predetermined temperature range and a predetermined wavelength range includes (i) an imaging-sensor array, (ii) a plurality of focusing elements and (iii) a plurality of filtering elements. The wavelength range over which the detector assembly is configured to image a scene includes a central wavelength about which the predetermined wavelength range is centered. Various versions are configured to image scenes over a wavelength range including wavelengths typically visible to humans. That is, alternative versions are configured to image over a wavelength range that is at least partially detectable by the human eye.

The imaging-sensor array as a whole includes a plurality of photosensitive detector elements situated so as to form an array structure of a type alternatively referred to by those of ordinary skill in the relevant arts as a "focal plane array," a "detector array," and an "imager," for example. In various versions, the detector array comprises a plurality of pre-defined detector-array sections each of which is configured to detect an image of a scene as described hereinbelow.

Situated in optical communication with the detector array is a plurality of optical focusing elements. The optical focusing elements of alternative versions may be of one or more general types including, but not limited to (i) lenses, (ii) lenslets, (iii) reflective elements including, for example, concave mirrors, and (iv) graded-refractive-index (GRIN) elements including GRIN optical fibers, by way of non-limiting example. In each of various versions, the plural optical focusing elements are integrally formed within a unitary plate or sheet-like, translucent substrate made from a material such as glass or plastic to form a focusing-element array. Each of the focusing elements is aligned for focusing upon a corresponding one of the plurality of detector-array sections an image of a scene. Each focusing element is capable of focusing upon a corresponding one of the plurality of detector-array sections an image of the scene substantially identical to the image of the scene that each of the other focusing elements is capable of focusing upon the detector-array section corresponding thereto. Each focusing element and its corresponding detector-array section define an associated and unique optical path.

The detector assembly further includes a plurality of optical filtering elements, which may be interchangeably referred to as "filters." Each filtering element is situated within, and optically correlated with, at least one of the optical paths and the detector-array section associated therewith such that electromagnetic energy that passes through the filtering element impinges upon the at least one detector-array section optically correlated with that filtering element. "Optical path" is defined herein such that each optical path extends forward of the focusing element that defines it. Accordingly, the optical filtering element associated with each optical path may be situated between the focusing element and its corresponding detector-array subsection or "forward of" the focusing element such that the focusing element is situated between the filtering element and the detector-array subsection. In addition, the optical filtering element is, in alternative versions, a spectral and/or polarizing filter that is (i) a structure separately identifiable from the detector array and the at least one focusing element with which it is aligned, (ii) a coating applied to either side of the focusing element, and (iii) a coating applied to a set of detector elements.

Each filtering element is configured to transmit, at a filter-specific maximum intensity, the central wavelength of the predetermined wavelength range at a temperature disparate from the temperature at which each filtering element of a selected set of the other filtering elements of the assembly is configured to transmit the central wavelength. In various versions, the transmittance of the central wavelength as a function of temperature for each filtering element at least partially overlaps the transmittance of the central wavelength as a function of temperature of at least one of the other filtering elements among the plurality of filtering elements. Such overlapping in the transmittances of filtering elements facilitates the imaging of a scene over a temperature range extending from the lowest temperature at which the filtering element with the lowest transmittance temperature will transmit wavelengths within the predetermined wavelength range and the highest temperature at which the filtering element with the highest transmittance temperature will transmit wavelengths within the predetermined wavelength range. It will be readily appreciated by those of ordinary skill in the art that an assembly configured in accordance with the aforesaid parameters expands the range of temperature-dependent wavelength detection relative to the detection capabilities of a single-filter solution, for example. In at least one version in which the filters exhibit mutually overlapping temperature dependent transmittances, the transmissive behavior exhibited by each filtering element may be characterized by a transmittance curve indicative of either (i) transmission intensity versus temperature over a fixed wavelength range or (ii) transmission intensity versus wavelength at a fixed temperature. Those of ordinary skill in the art will appreciate that the aforesaid alternative graphic expressions of the transmittance curve are, in actuality, simply alternative ways of expressing the same temperature dependent transmittance behavior. In either event, those of ordinary skill will also appreciate that the functionality of various versions is enhanced when the filters are selected such that overlap in transmittance between any two "overlapping filters" occurs at a readily detectable intensity as opposed to a relatively low intensity. Accordingly, in various versions, the filters are selected such that, at any given temperature within the functional temperature range of the system, there is overlap in the transmittance curves of "graphically adjacent" filtering elements at an intensity level no lower than half the maximum (the "half-max") of transmittance intensity of each of the overlapping filters.

Representative, non-limiting implementations are more completely described and depicted in the following detailed description and the accompanying drawings.

DETAILED DESCRIPTION

The following description of variously embodied spectral detector assemblies and a spectral detection system incorporating a multi-filter detector assembly is demonstrative in nature and is not intended to limit the invention or its application of uses. Accordingly, the various implementations, aspects, versions and embodiments described in the summary and detailed description are in the nature of non-limiting examples falling within the scope of the appended claims and do not serve to define the maximum scope of the claims.

Figure 1:
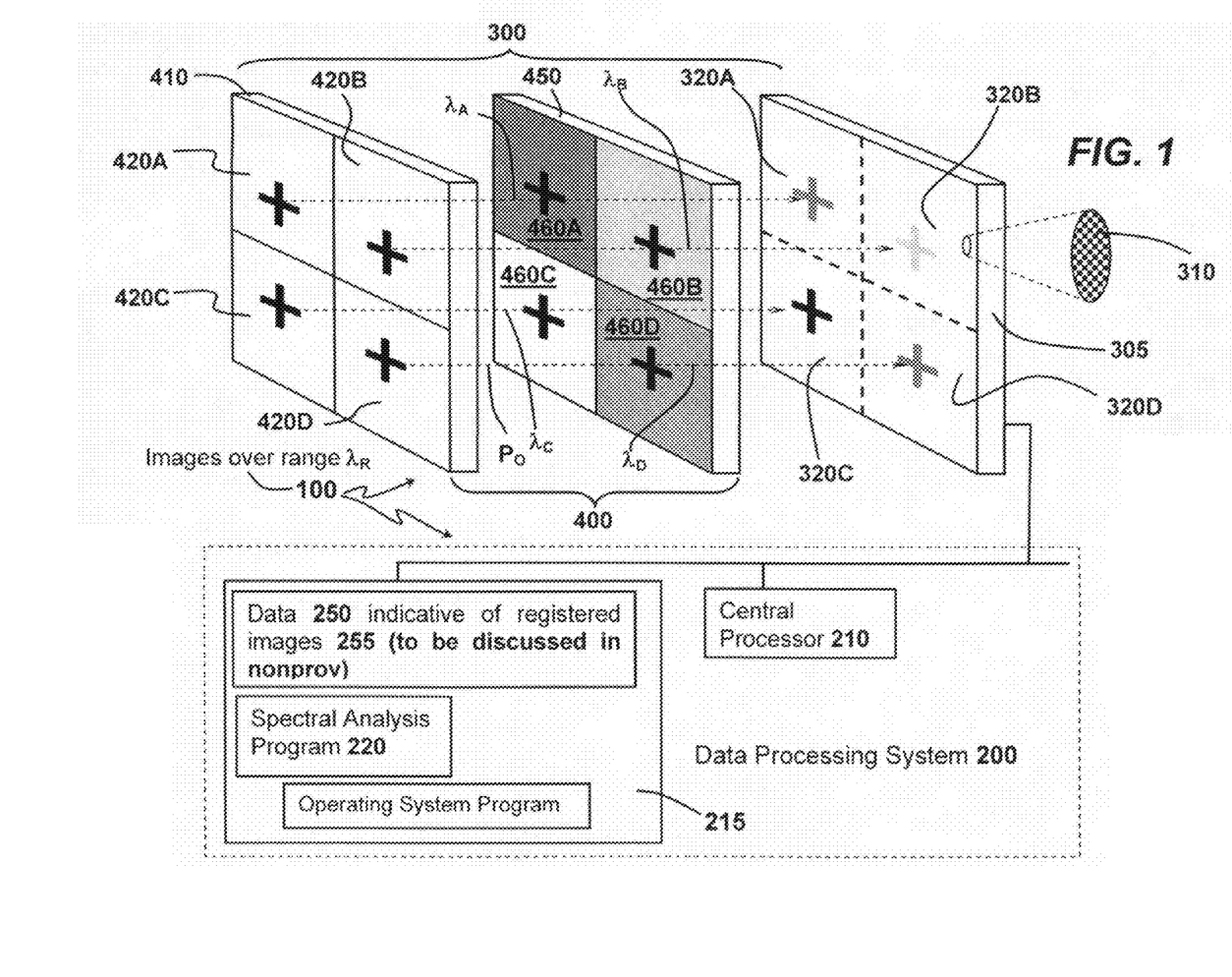
FIG. 1 is a schematic representation of an illustrative multi-filter spectral detection system.

Referring to FIG. 1, the architecture of an illustrative spectral detection system 100 is schematically represented and includes (i) a data processing system 200 and (ii) a detector assembly 300 including (a) an imaging-sensor array 305 communicatively linked to the data processing system 200 and (b) an optical system 400 configured for imaging electromagnetic energy emitted from an object source event (not shown) external to the optical system 400 onto the imaging-sensor array 305. The imaging-sensor array 305 may be alternatively referred to as the "detector array 305" in the current description. The illustrative system 100 of FIG. 1 is configured to detect and analyze the spectral content of electromagnetic energy emitted from a source event over a predetermined temperature range $T_R$ and a predetermined wavelength range $\lambda_R$ of interest. The predetermined wavelength range $\lambda_R$ of interest includes a central wavelength $\lambda_{CEN}$ about which the predetermined wavelength range $\lambda_R$ is centered.

The data processing system 200 includes a central processor 210 and a memory 215 and is programmed to execute spectral analysis algorithms 220 relative to the detection and analysis of wavelengths within a predetermined wavelength range $\lambda_R$ of interest. Alternative implementations incorporate any of a variety of conventional detector arrays 305 adapted to detect wavelengths over a predetermined range of electromagnetic wavelengths. A typical detector array 305 suitable for implementing embodiments of the invention includes photosensitive detectors elements 310 that are, to the extent practicable, uniformly sized and regularly spaced.

The optical system 400 schematically represented in the illustrative implementation of FIG. 1 includes a plurality of optical focusing elements 420. Although the optical focusing elements 420 of various implementations may be independently supported in a fixed spatial relationship with respect to the imaging-sensor array 305, the optical focusing elements 420 of the version of FIG. 1 are formed integrally within a unitary focusing-element array 410. As described in the summary, such a focusing-element array 410 may be formed, for example, from a unitary plate or sheet-like, translucent substrate made from a material such as glass or plastic. Alternatively, within the scope and contemplation of the invention as expressed in the appended claims are versions in which individual focusing elements 420 are adhered or otherwise affixed to a substrate or framework in order to retain them in fixed positions relative to the imaging-sensor array 300. The optical focusing elements 420 of alternative versions may be of one or more types, including but not limited to (i) lenses with concave or convex faces, (ii) lenslets, (iii) reflective elements including, for example, concave mirrors and (iv) graded-refractive-index (GRIN) elements including GRIN optical fibers, by way of non-limiting example.

Referring still to the illustrative version of FIG. 1, the detector array 305 comprises a plurality of predefined detector-array sections 320. In a manner more fully described later in the description, each detector-array section 320 is dedicated to the to detection, at a section-specific maximum intensity, of the central wavelength $\lambda_{CEN}$ at a temperature $T_x$ different from the temperatures at which other detector-array sections 320 are designed to detect (register) the central wavelength $\lambda_{CEN}$ at their corresponding section-specific maximum intensities. The section-specific maximum intensity of each detector-array section 320 is determined by a filter 460 associated with that detector-array section 320 as described later in the detailed description. For clarity in the description and associated drawings (including FIG. 1), each detector-array section 320 is identified by a reference character including the number "320" that identifies it generally as a detector-array section, followed by a capital letter (e.g., A, B, C or D) to distinguish it from other detector-array sections and signify that it is associated with the detection of the central wavelength $\lambda_{CEN}$ at a particular temperature (e.g., $T_A$, $T_B$, $T_D$ or $T_D$). When referred to collectively or non-specifically in this description, the detector-array sections 320 are referenced without alphabetic characters, despite the fact that no such "collective" or "generalized" reference character is used in the drawings. A similar convention applies to the referencing of other elements introduced elsewhere in this description.

Each focusing element 420 is optically aligned with, and capable of focusing upon, a corresponding one of the plurality of detector-array sections 320 an image of a scene correlating to the image of the same scene that each of the other focusing elements 420 is capable of focusing upon the detector-array section 320 corresponding thereto. Each focusing element 420 and its corresponding detector-array section 320 define a unique optical path $P_O$ that, in FIG. 1, is indicated by a dashed arrow. In a manner similar to which each of the detector-array sections 320 is uniquely identified by the inclusion of a letter (A, B, C and D) in its reference character, each optical focusing element 420 is referenced by a reference character including a letter (A, B, C and D) indicative of its correspondence with the detector-array section whose reference character includes the same letter.

The detector assembly 300 further includes a plurality of optical filtering elements 460. Each of filtering elements 460A, B, C and D is configured to transmit, at a filter-specific maximum intensity $I_{Max}$, the central wavelength $\lambda_{CEN}$ of the predetermined wavelength range $\lambda_R$ at a temperature disparate from the temperature at which each of the other filtering elements among filtering elements 460A, B, C and D is configured to transmit the central wavelength $\lambda_{CEN}$. Each of the filtering elements 460 is situated within, and optically correlated with, one of the optical paths $P_O$ associated with a detector-array section 320 as indicated by correspondence among the reference letters used in association with the reference numbers as previously described.

Another way of conceptualizing the arrangement and use of a filter set comprising plural filter elements 460 each of which transmits, at a filter-specific maximum intensity $I_{Max}$, the central wavelength $\lambda_C$ at disparate temperatures $T_A$, $T_B$, $T_C$ and $T_D$ is to consider, with reference to FIGS. 1, 2A and 2B, that the filtering elements 460A, B, C and D are "centered" at disparate wavelengths when all filtering elements 460A, B, C and D are at the same temperature $T_x$. Referring to FIGS. 2A and 2B, consider for illustrative purposes that the detector assembly 300 of FIG. 1 is designed to detect the spectral content of an electromagnetic-energy emitting source event over a narrow range 4 nm wide at the full width half maximum (FWHM) and for which 766 nm is the central wavelength $\lambda_{CEN}$ (i.e., 766 nm+/−2 nm at FWHM). In the examples of FIGS. 2A and 2B, each of filtering elements 460A, B, C and D has an assumed, illustrative full width half maximum value of 4 nm at the temperature at which that filter element passes the central wavelength $\lambda_{CEN}$ at its filter-specific maximum intensity $I_{Max}$. Also for illustrative purposes, each of filtering elements 460A, B, C and D has an assumed temperature coefficient of 0.5 nm/deg. C. That is, the effective wavelength at which each filtering element is "centered" (i.e., transmits at its filter-specific maximum intensity $I_{Max}$) "drifts" by 0.5 nm with each 1-degree C. change in temperature. In addition to the aforementioned arbitrarily selected illustrative parameters, with reference to FIG. 2A, which graphically depicts the transmittance behavior of the filtering elements 460A, B, C and D of FIG. 1 at $T_X=T_B=20°$ C., filtering element 460B is configured such that it passes, with its filter-specific maximum intensity $I_{Max}$, the central wavelength $\lambda_{CEN}$ of 766 nm. While at $T_X=20°$ C., filtering element 460B passes the central wavelength $\lambda_{CEN}$ with the highest relative intensity, filtering elements 460A and 460C "overlap," in the their transmittances, with filtering element 460B in that filtering elements 460A and 460C also pass the 766 nm central wavelength $\lambda_{CEN}$, albeit at lower intensities than that at which filter 460B passes the central wavelength $\lambda_{CEN}$. That filtering elements 460A and 460C pass the central wavelength $\lambda_{CEN}$ at 20° C. with a lower intensity than that at which filtering element 460B passes the central wavelength $\lambda_{CEN}$ at 20° C. is indicated in FIG. 2A by the dashed transmittance curves associated with filtering elements 460A and 460C. Filtering element 460D does not transmit the central wavelength $\lambda_{CEN}$ at all at $T_X=T_B=20°$ C., a phenomenon that is indicated in FIG. 2A by the dotted transmittance curve associated with filtering element 460D.

FIG. 2B represents the transmittance behavior of the same filtering elements 460A, B, C and D at $T_X=T_D=28°$ C. Filtering element 460D is configured such that it passes, at its filter-specific maximum intensity $I_{Max}$, the central wavelength $\lambda_{CEN}$ of 766 nm at $T_X=T_D=28°$ C. Because filtering element 460D is at the higher end of the temperature range over which the illustrative detector assembly 300 operates, the transmittance curve of filtering element 460C alone overlaps with that of filtering element 460D at $T_X=T_D=28°$ C. That is, in a fashion similar to which filtering elements 460A and 460C function at $T_X=T_B=20°$ C., as depicted in FIG. 2A, filtering element 460C functions at $T_X=T_D=28°$ C.; it passes the 766 nm central wavelength $\lambda_{CEN}$ at an intensity lower than that at which filtering element 460D passes the central wavelength $\lambda_{CEN}$. The lower-intensity transmittance of filtering element 460C is again indicated in FIG. 2B by the dashed transmittance curve associated therewith, while the dotted transmittance curves associated with filtering elements 460A and 460B indicate that filtering elements 460A and 460B do not transmit at all the 766 nm central wavelength $\lambda_{CEN}$ at $T_X=T_D=28°$ C.

Stated in the summary was the fact that the functionality of various versions is enhanced when the filtering elements 460 are selected such that overlap in transmittance between any two "overlapping filters" occurs at a readily detectable intensity as opposed to a relatively low intensity. Accordingly, in various versions, the filtering elements 460 are configured such that, at any given temperature within the functional temperature range of the spectral detection system 100, there is overlap in the transmittance curves of "graphically adjacent" filtering elements 460 at an intensity level no lower than half the maximum (the "half-max") of transmittance intensity of each of the overlapping filtering elements 460. Such is the illustrative transmittance behavior among the filtering elements 460A, B, C and D depicted in FIGS. 2A and 2B. For instance, consider that at $T_X=T_B=20°$ C., when filtering element 460B is transmitting the 766 nm central wavelength $\lambda_{CEN}$ with its filter-specific maximum intensity $I_{Max}$, each of filtering elements 460A and 460C, while passing the central wavelength $\lambda_{CEN}$ at an intensity lower than that at which filtering element 460B does, is passing the central wavelength $\lambda_{CEN}$ with an intensity greater than half the value of its filter-specific maximum intensity $I_{Max}$.

The selection of filtering elements 460 whose transmittances as a function temperature "overlap" as generally described renders the system 100 capable of detecting the central wavelength $\lambda_{CEN}$ over an extended continuum of temperatures relative to, for example, a single-filter solution or a multi-filter solution in which there are "gaps" in the operational temperature range of the system 100. Moreover, "tight" overlap (e.g., overlap at intensities at or above the FWHM values of neighboring filtering elements) provides appreciable functional redundancy. More specifically, if at every temperature within the operational temperature range of the system 100 there are at least two filtering elements 460 transmitting the central wavelength $\lambda_{CEN}$ to corresponding detector-array sections 320 with a non-negligible intensity, then mechanical damage to any given filtering element 460 or its corresponding focusing element 420 or detector-array section 320, for example, will not result in an appreciable "gap" in the effective temperature range over which the system 100 is operative. Referring again to FIGS. 1 and 2A, consider a scenario in which at least one of (i) focusing element 420B, (ii) filtering element 460B and (iii) detector-array section 320B has been damaged or lost such that there is effectively no longer an optical path $P_O$ defined among these three components, a condition that is graphically represented in FIG. 3 by the lack of any transmittance curve associated with filter 460B. One will appreciate with reference to FIG. 3 that, under such circumstances, the central wavelength $\lambda_{CEN}$ cannot impinge upon the detector array 305 with the filter-specific maximum intensity $I_{Max}$ of any one of filtering elements 460 at $T_X=T_B=20°$ C. However, with continued reference to FIG. 3, it will be appreciated that at 20° C., filtering elements 460A and 460C "fill in" and provide a non-negligible measure of redundancy for non-operational filtering element 460B. More specifically, because each of filtering elements 460A and 460C passes the central wavelength $\lambda_{CEN}$ to some degree (less than its filter-specific maximum intensity $I_{Max}$), the detector array 305 will still register, at reduced intensity, the 766 nm central wavelength $\lambda_{CEN}$ within detector-array sections 320A and 320C associated with, respectively, filtering elements 460A and 460C.

The "operational" range of the spectral detection system 100 may be alternatively defined. In accordance with a first definition, the operational range is regarded as the temperatures between and including (i) the lowest temperature at which any of the filtering elements 460 transmits the central wavelength $\lambda_{CEN}$ at its filter-specific maximum intensity $I_{Max}$ and (ii) the highest temperature at which any of the filtering elements 460 transmits the central wavelength $\lambda_{CEN}$ at its filter-specific maximum intensity $I_{Max}$. Defined thusly, a system 100 including four filtering elements 460A, B, C and D whose transmittance characteristics are represented in FIGS. 2A and 2B would have an operational range of 12° C. extending between and including the temperature at which filtering element 460A transmits the central wavelength $\lambda_{CEN}$ at its filter-specific maximum intensity $I_{Max}$ (i.e., $T_A$=16° C.) and the temperature at which filtering element 460D transmits the central wavelength $\lambda_{CEN}$ at its filter-specific maximum intensity $I_{Max}$ (i.e., $T_D$=28° C.). A second way to define the operational range is to include within the range (i) the lowest temperature at which any of the filtering elements 460 transmits the central wavelength $\lambda_{CEN}$ with an intensity that is at least half the value of its filter-specific maximum intensity $I_{Max}$ and (ii) the highest temperature at which any of the filtering elements 460 that transmits the central wavelength $\lambda_{CEN}$ with an intensity that is at least half the value of its filter-specific maximum intensity $I_{Max}$. In accordance with the second definition, the operational range of a system 100 including four filtering elements 460A, B, C and D whose transmittance characteristics are represented in FIGS. 2A and 2B would have an operational range of 20° C. extending between and including the lowest temperature at which filtering element 460A transmits the central wavelength $\lambda_{CEN}$ at half its filter-specific maximum intensity $I_{Max}$ (i.e., $T_X$=12° C.) and the highest temperature at which filtering element 460D transmits the central wavelength $\lambda_{CEN}$ at half its filter-specific maximum intensity $I_{Max}$ (i.e., $T_X$=32° C.). While the illustrative operational temperature ranges in accordance with alternative definitions are not explicitly shown in the drawings, they are readily calculable for the examples provided based on the information provided in association with FIGS. 2A and 2B (i.e., the FWHM values and temperature coefficients of the illustrative filtering elements 460). Those of ordinary skill in the art will appreciate that definitions of "operational range" within the scope and contemplation of the invention, and alternative to those provided above, may be established.

As noted in the summary, for purposes of this specification and the appended claims, "optical path" is defined such that each optical path $P_O$ extends forward of the focusing element 420 that defines it. Accordingly, while the optical filtering elements 460 associated with the configuration of FIG. 1 are situated between the focusing elements 420 and their corresponding detector-array sections 320, alternative embodiments within the scope and contemplation of the invention include at least one optical path $P_O$ for which the focusing element 420 is situated between the filtering element 460 and the corresponding detector-array section 320. Moreover, while in the version of FIG. 1, each of the optical filtering elements 460A, B, C and D is part of a unitary filter array 450, the filtering elements 460 could be independently supported in fixed spatial relationship with the image-sensor array 305.

Those of ordinary skill in the relevant arts will appreciate that the specific configurations and implementations described and depicted are merely illustrative in nature and that many specific parameters may be altered among various embodiments within the scope and contemplation of the invention. For example, the illustrative examples included four each of (i) focusing elements 420, (ii) filtering elements 460 and detector-array sections 320 for the sake or simplicity and clarity; however, the quantity of these components may be greater or fewer than four in various embodiments. It will be appreciated that a greater number of filtering elements 460, and corresponding focusing elements 420 and detector-array sections 320, can be employed to at least one of (i) expand the operational temperature range of and (ii) provide greater redundancy within various versions. Additional parameters subject to ready manipulation include the full width half maximum FWHM values and the temperature coefficients of the filtering elements 460. Moreover, the central wavelength $\lambda_{CEN}$ that any particular implementation is configured to detect is subject to alternation. For instance, alternative systems configured for the detection of combusting barium, sodium, calcium, or lithium would have associated with them central wavelengths $\lambda_{CEN}$ of, respectively, 520 nm, 589 nm, 620 nm, and 671 nm, by way of non-limiting example. Furthermore, alternative versions may be configured for the detection of two or more central wavelengths $\lambda_{CEN}$.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact constructions, implementations and versions shown and described.

What is claimed is:

1. A detector assembly for imaging a scene over a predetermined temperature range and a predetermined wavelength range including a central wavelength about which the predetermined wavelength range is centered, the detector assembly comprising:
   an imaging-sensor array configured to detect wavelengths over a predetermined range of electromagnetic wavelengths, the array including a plurality of detector-array sections;
   a plurality of focusing elements, each focusing element being capable of focusing upon a corresponding one of the plurality of detector-array sections an image of the scene correlating to the image of the scene that each of the other focusing elements is capable of focusing upon the detector-array section corresponding thereto, each focusing element and the detector-array section corresponding thereto defining an associated optical path; and
   a plurality of optical filtering elements each of which filtering elements is situated within, and optically correlated with, at least one of the optical paths associated with a detector-array section such that electromagnetic energy that passes through that filtering element impinges upon the at least one detector-array section optically correlated with that filtering element;
   wherein (i) each filtering element is configured to transmit, at a filter-specific maximum intensity, the central wavelength at a filter temperature disparate from the filter temperature at which each filtering element of a selected set of the other filtering elements is configured to transmit the central wavelength and (ii) the transmittance as a function of filter temperature for each filtering element at least partially overlaps the transmittance as a function of filter temperature of at least one other filtering element among the plurality of filtering elements.

2. The detector assembly of claim 1 wherein
   (a) the transmittance behavior exhibited by each filtering element is characterized by a transmittance curve indicative of one of (i) transmission intensity versus filter temperature over a fixed wavelength range and (ii) transmission intensity versus wavelength at a fixed filter temperature; and (b) the filtering elements are selected such that, at a given filter temperature within a predetermined functional temperature range of the detector assembly, there is overlap in the transmittance curves of at least two filtering elements at an intensity level no lower than half the maximum of transmittance intensity of each of the at least two filtering elements.

3. The detector assembly of claim 2 wherein the predetermined wavelength range includes 766 nm.

4. The detector assembly of claim 3 wherein 766 nm is the central wavelength.

5. The detector assembly of claim 1 wherein 766 nm is the central wavelength.

6. The detector assembly of claim 1 wherein the predetermined wavelength range includes at least one of 520 nm, 589 nm, 620 nm and 671 nm associated with, respectively, the combustion of barium, sodium calcium, and lithium.

7. The detector assembly of claim 6 wherein the central wavelength is one of 520 nm, 589 nm, 620 nm and 671 nm.

8. A detector assembly for imaging a scene over a predetermined temperature range and a predetermined wavelength range including a central wavelength about which the predetermined wavelength range is centered, the detector assembly comprising:

an imaging-sensor array configured to detect wavelengths over a predetermined range of electromagnetic wavelengths, the array including a plurality of detector-array sections;

a plurality of focusing elements, each focusing element being capable of focusing upon a corresponding one of the plurality of detector-array sections an image of the scene correlating to the image of the scene that each of the other focusing elements is capable of focusing upon the detector-array section corresponding thereto, each focusing element and the detector-array section corresponding thereto defining an associated optical path; and a plurality of optical filtering elements each of which filtering elements is situated within, and optically correlated with, at least one of the optical paths associated with a detector-array section such that electromagnetic energy that passes through that filtering element impinges upon the at least one detector-array section optically correlated with that filtering element;

wherein (i) each filtering element is configured to transmit, at a filter-specific maximum intensity, the central wavelength at a filter temperature disparate from the filter temperature at which each filtering element of a selected set of the other filtering elements is configured to transmit the central wavelength; (ii) the transmittance as a function of filter temperature for each filtering element at least partially overlaps the transmittance as a function of filter temperature of at least one other filtering element among the plurality of filtering elements; and at least one of (a) the plural optical focusing elements are lenslets integrally formed within a unitary focusing-element array fabricated from one of glass and plastic and (b) each of the filtering elements is supported within a unitary filter array.

9. The detector assembly of claim 8 wherein each filtering element is situated between the focusing element and the detector-array section with which that filtering element is associated.

10. The detector assembly of claim 9 wherein the predetermined wavelength range includes at least one of 520 nm, 589 nm, 620 nm, 671 nm and 766 nm associated with the combustion of, respectively, barium, sodium calcium, lithium and potassium.

11. The detector assembly of claim 10 wherein the central wavelength is one of 520 nm, 589 nm, 620 nm, 671 nm and 766 nm.

12. The detector assembly of claim 9 wherein the predetermined wavelength range includes at least one wavelength that is visible to a typical human.

13. The detector assembly of claim 8 wherein the predetermined wavelength range includes at least one of 520 nm, 589 nm, 620 nm, 671 nm and 766 nm associated with the combustion of, respectively, barium, sodium calcium, lithium and potassium.

14. The detector assembly of claim 13 wherein the central wavelength is one of 520 nm, 589 nm, 620 nm, 671 nm and 766 nm.

15. The detector assembly of claim 14 wherein the central wavelength is 766 nm.

16. The detector assembly of claim 8 wherein the predetermined wavelength range includes at least one wavelength that is visible to a typical human.

17. The detector assembly of claim 16 wherein the central wavelength is visible to a typical human.

18. The detector assembly of claim 8 wherein (a) the transmittance behavior exhibited by each filtering element is characterized by a transmittance curve indicative of one of (i) transmission intensity versus filter temperature over a fixed wavelength range and (ii) transmission intensity versus wavelength at a fixed filter temperature; and (b) the filtering elements are selected such that, at a given filter temperature within a predetermined functional temperature range of the detector assembly, there is overlap in the transmittance curves of at least two filtering elements.

19. The detector assembly of claim 18 wherein the overlap in the transmittance curves occurs at an intensity level no lower than half the maximum of transmittance intensity of each of the at least two filtering elements.

* * * * *